US012591906B2

(12) United States Patent
 Kurabayashi

(10) Patent No.: US 12,591,906 B2
(45) Date of Patent: Mar. 31, 2026

(54) SYSTEM FOR EXECUTING PRESCRIBED PROCESSING IN RESPONSE TO MESSAGE TRANSMISSION

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 7 days.

(21) Appl. No.: 18/432,927

(22) Filed: Feb. 5, 2024

(65) Prior Publication Data

US 2024/0211989 A1 Jun. 27, 2024

Related U.S. Application Data

(63) Continuation of application No. PCT/JP2022/029811, filed on Aug. 3, 2022.

(30) Foreign Application Priority Data

Aug. 5, 2021 (JP) ................................. 2021-129101

(51) Int. Cl.
 *A63F 9/24* (2006.01)
 *G06Q 30/0207* (2023.01)
(52) U.S. Cl.
 CPC ..... *G06Q 30/0236* (2013.01); *G06Q 30/0209* (2013.01)
(58) Field of Classification Search
 CPC ........... G06Q 30/0236; G06Q 30/0209; G06Q 30/02; G06Q 50/01; G06Q 50/00; G06F 13/00
 See application file for complete search history.

(56) References Cited

U.S. PATENT DOCUMENTS

2002/0188509 A1* 12/2002 Ariff .................. G06Q 30/0613
                                                   705/14.27
2006/0167748 A1* 7/2006 Hartmann .......... G06Q 30/0273
                                                   705/14.69
(Continued)

FOREIGN PATENT DOCUMENTS

JP       2016-062105 A    4/2016
JP        6745744 B2      8/2020
WO   WO-2015083432 A1 *   6/2015   ............. A63F 13/30

OTHER PUBLICATIONS

Goodies for Data: Game-based Data Propagation in DTNs, Sebastian Schildt and Lars Wolf 322 (Year: 2012).*

(Continued)

*Primary Examiner* — Ilana L Spar
*Assistant Examiner* — Darnell A Pouncil
(74) *Attorney, Agent, or Firm* — Osha Bergman Watanabe & Burton LLP

(57) ABSTRACT

One or more embodiments of the invention is a system for executing prescribed processing in response to transmission of a message relating to a prescribed campaign, the prescribed processing relating to a user who has transmitted the message, wherein a server, upon receiving request information relating to a prescribed campaign from one user via a client terminal, generates or determines a second identifier including a first identifier, and transmits information including the first identifier to the client terminal, and upon a message including the second identifier including the first identifier being transmitted to an SNS server by the client terminal on the basis of the information received from the server, the server acquires user identification information on the basis of an access from the SNS server to the second (Continued)

identifier included in the message, and executes the pre-scribed processing in association with the user identification information.

13 Claims, 5 Drawing Sheets

(56) References Cited

U.S. PATENT DOCUMENTS

| | | | |
|---|---|---|---|
| 2012/0004038 A1* | 1/2012 | Van Luchene | G07F 17/3274 |
| | | | 463/42 |
| 2024/0226728 A9* | 7/2024 | Ishii | A63F 13/795 |

OTHER PUBLICATIONS

International Search Report issued in PCT/JP2022/029811 on Oct. 18, 2022 (5 pages).
Written Opinion of the International Searching Authority issued in PCT/JP2022/029811 on Oct. 18, 2022 (4 pages).

* cited by examiner

| GAME SERVER UNIT | 21 |
| IDENTIFIER GENERATION UNIT | 22 |
| ACCESS ACQUISITION UNIT | 23 |
| CAMPAIGN-DATA STORAGE UNIT | 24 |
| MANAGEMENT-DATA STORAGE UNIT | 25 |

10

| One-Time URL | User ID | Optional Data |
|---|---|---|
| ... | ... | ... |
| https://example.com/sa78dsajfe683asddsa89sagr | 100000000009 | {JSON DATA} |
| https://example.com/90dsajt54hukfds78cxzbjk2s | 100000000010 | {JSON DATA} |
| ... | ... | ... |

SYSTEM FOR EXECUTING PRESCRIBED PROCESSING IN RESPONSE TO MESSAGE TRANSMISSION

TECHNICAL FIELD

The present invention relates to systems, servers, methods, and programs for executing prescribed processing in response to message transmission.

BACKGROUND ART

As an increasing number of users are enjoying online games in which the users can participate via a network, there are cases where, in order to promote the use of game apps for online games, various campaigns are run by utilizing other systems and media. For example, Patent Literature 1 discloses a technology for promoting the use of a game app through a campaign using serial codes. Meanwhile, as there is a large number of users who use SNSs recently, there are cases where game administrators provide SNS-linked promotion programs for game apps, for example, by running "trend campaigns", in which the success or failure of a campaign depends on whether or not a hashtag is trending, "RT campaigns", in which users can participate by following the official account and retweeting content.

CITATION LIST

Patent Literature

[PTL 1]
    Japanese Unexamined Patent Application, Publication No. 2016-062105
[PTL 2]
    Publication of Japanese Patent No. 6745744

SUMMARY OF INVENTION

Technical Problem

In running a campaign for an app that is subject to promotion, such as a game app, there is a need for a system in which the app is closely linked to an SNS and in which certain rewards are granted to users who have participated in the campaign. There have been demands for realizing this kind of system such that users can participate by using a simpler method.

The present invention has been made in order to solve the problem described above, and it is an object thereof to provide a system, etc. that makes it possible for users to participate by using a simpler method in the case where a prescribed SNS-linked campaign is run in a subject app.

Solution to Problem

[1] A system according to an embodiment of the present invention is a system, including a server and a client terminal, for executing prescribed processing in response to transmission of a message relating to a prescribed campaign, the prescribed processing relating to a user who has transmitted the message, wherein:

the server, upon receiving request information relating to a prescribed campaign from one user via the client terminal, generates or determines a second identifier including a first identifier, the first identifier being user identification information that makes it possible to identify the one user or being based on the user identification information, and transmits information including the first identifier to the client terminal, the client terminal, upon receiving the information including the first identifier from the server, displays a screen for transmitting a message including the second identifier including the first identifier to an SNS server, or transmits the message to the SNS server, and upon the message being transmitted to the SNS server by the client terminal, the server acquires user identification information on the basis of an access from the SNS server to the second identifier included in the message, and executes the prescribed processing in association with the user identification information.

[2] One embodiment of the present invention is a system according to [1],
    wherein the second identifier generated or determined by the server is a temporary identifier associated with the user identification information that makes it possible to identify the one user.

[3] One embodiment of the present invention is a system according to [1],
    wherein the first identifier included in the second identifier generated or determined by the server is non-temporary user identification information that makes it possible to identify the one user, or is an identifier associated with the user identification information.

[4] One embodiment of the present invention is a system according to any one of [1] to [3],
    wherein, upon receiving the information including the first identifier from the server, the client terminal starts an SNS application, and displays a screen for transmitting the message including the second identifier including the first identifier to the SNS server, or transmits the message to the SNS server.

[5] One embodiment of the present invention is a system according to any one of [1] to [4], wherein:
    the client terminal has installed therein a prescribed application that communicates with the server and that identifies a user by using user identification information, and
    the first identifier included in the second identifier is non-temporary user identification information used in the prescribed application, or is an identifier associated with the user identification information.

[6] One embodiment of the present invention is a system according to [5], wherein:
    the system is a system for providing a game to users,
    the prescribed application is an application relating to a game, and
    the prescribed processing is granting of a prescribed reward, which is executed in association with user identification information.

[7] One embodiment of the present invention is a system according to [5] or [6],
    wherein when the prescribed application is running, while having logged in by using user identification information, the client terminal transmits the request information including the user identification information to the server in response to a user operation performed via an interface for accepting message transmission to the SNS server.

[8] One embodiment of the present invention is a system according to any one of [1] to [7],
    wherein the information including the first identifier, which is transmitted by the server, is the first identifier or the second identifier.

[9] One embodiment of the present invention is a system according to any one of [1] to [8], wherein:

the server includes a management database that stores user identification information and second identifiers in association with each other, and the server, upon accepting an access from an SNS server to the second identifier included in the message transmitted by the client terminal, acquires the user identification information associated with the second identifier in the management database.

[10] One embodiment of the present invention is a system according to [9], wherein the server stores execution information in association with user identification information in the management database, the execution information indicating whether or not the prescribed processing has already been executed, and when the prescribed processing has been executed, the server updates the corresponding execution information stored in the management database.

[11] One embodiment of the present invention is a system according to [10], wherein, upon receiving request information relating to the prescribed campaign from one user, the server determines, on the basis of the user identification information and the execution information stored in the management database, whether or not the request information from the one user, relating to the prescribed campaign, has been executed.

[12] A server according to one embodiment of the present invention is a server for executing prescribed processing in response to transmission of a message relating to a prescribed campaign, the prescribed processing relating to a user who has transmitted the message, wherein:

upon receiving request information relating to a prescribed campaign from one user via a client terminal, the server generates or determines a second identifier including a first identifier, the first identifier being user identification information that makes it possible to identify the one user or being based on the user identification information, and transmits information including the first identifier to the client terminal, and upon the client terminal transmitting a message including the second identifier including the first identifier to an SNS server on the basis of the information received from the server, the server acquires user identification information on the basis of an access from the SNS server to the second identifier included in the message, and executes the prescribed processing in association with the user identification information.

[13] A method according to one embodiment of the present invention is a method for executing prescribed processing in response to transmission of a message relating to a prescribed campaign in a system including a server and a client terminal, the prescribed processing relating to a user who has transmitted the message, the method including:

a step, executed at the server, upon receiving request information relating to a prescribed campaign from one user via the client terminal, of generating or determining a second identifier including a first identifier, the first identifier being user identification information that makes it possible to identify the one user or being based on the user identification information, and transmitting information including the first identifier to the client terminal;

a step, executed at the client terminal, upon receiving the information including the first identifier from the server, of displaying a screen for transmitting a message including the second identifier including the first identifier to an SNS server, or transmitting the message to the SNS server; and a step, executed at the server, upon the message being transmitted to the SNS server by the client terminal, of acquiring user identification information on the basis of an access from the SNS server to the second identifier included in the message, and executing the prescribed processing in association with the user identification information.

[14] A program according to one embodiment of the present invention causes a computer to execute the steps of a method according to [13].

Advantageous Effects of Invention

The present invention makes it possible for users to participate by using a simpler method in the case where a prescribed SNS-linked campaign is run in a subject app.

DESCRIPTION OF EMBODIMENTS

An embodiment of the present invention will be described below with reference to the drawings. A system 1 in the present invention is a system for executing prescribed processing in response to posting of a message relating to a prescribed campaign, the prescribed processing relating to the user who has posted the message. The posting of a message relating to a prescribed campaign is, for example, posting of a message to an SNS by a user, relating to a campaign for a game app or the like. The prescribed processing is, for example, processing for granting a reward in the game app to the users who has transmitted the message. In this description, "campaigns" include events, etc. for which prescribed periods are set, as well as ordinary campaigns. In this description, "social networking services (SNSs)" may include services or websites in general that make it possible to construct or that support construction of social networks. In this description, "posting of a message" is one example of transmitting a message. Therefore, the system 1 may be a system for executing prescribed processing in response to transmission of a message (message sharing by way of a method other than posting) relating to a prescribed campaign, the prescribed processing relating to the user who has transmitted the message. In this description, apps or applications mainly refer to apps that are installed on smartphones or tablets, but may refer to applications in general or programs in general.

Figure 1:
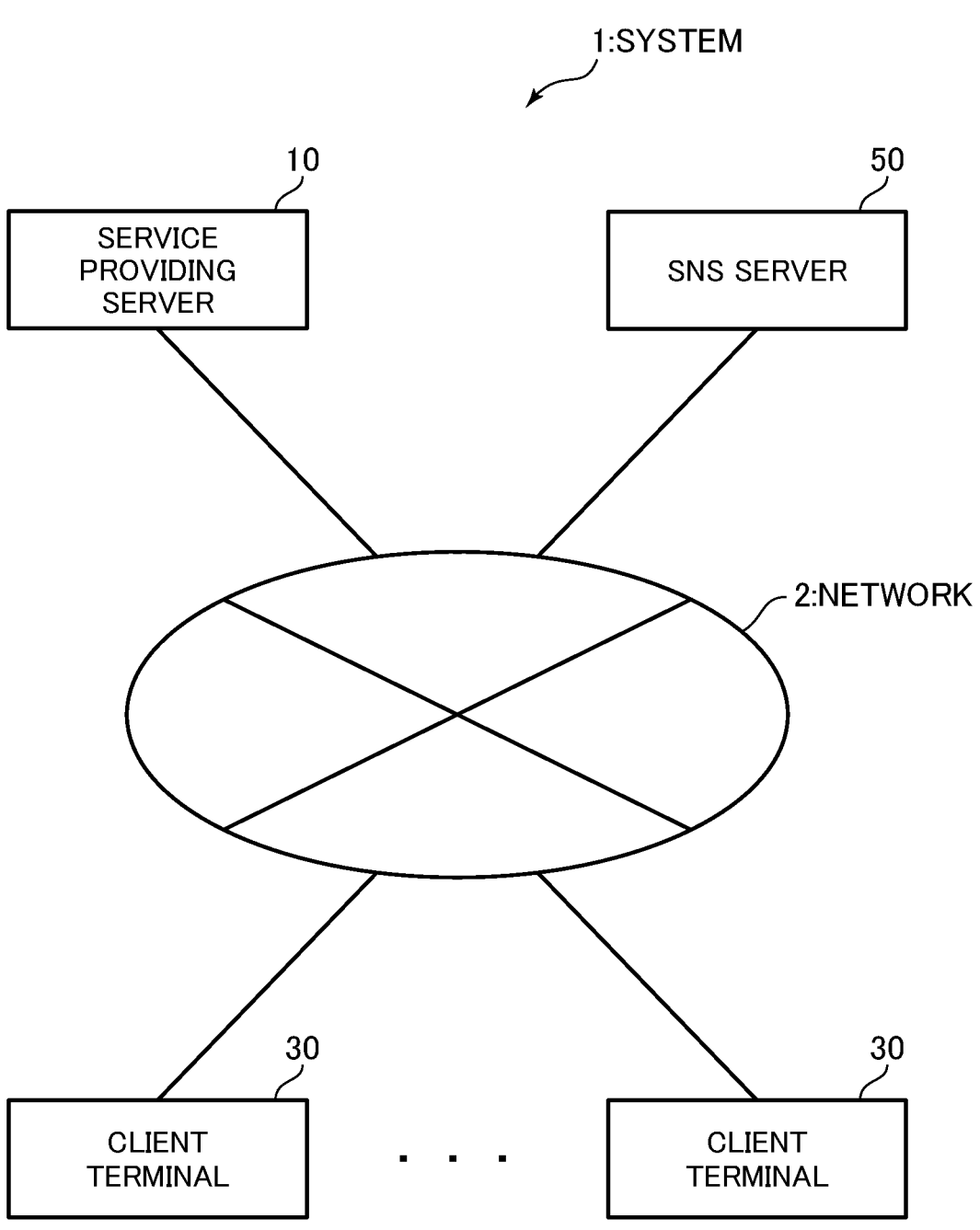
FIG. 1 is an overall configuration diagram of a system 1 in one embodiment of the present invention.

FIG. 1 is an overall configuration diagram of the system 1 in one embodiment of the present invention. As shown in FIG. 1, the system 1 includes a service providing server 10, client terminals 30, and an SNS server 50. The service providing server 10, the client terminals 30, and the SNS server 50 are connected to a network 2, such as the Internet, so as to be able to carry out communication with each other.

The SNS server 50 is a server that provides a social networking service (SNS) to users. The SNS server 50 is an example of a known SNS system constituted of a web server, an application server, etc. Each of the client terminals 30 connects to the SNS server 50 via an SNS app or a web browser. When a client terminal 30 has been identified and authenticated by using a user ID and a password or the like, the client terminal 30 can acquire information for the user having the user ID.

The SNS server 50 provides a known SNS service and has a function for allowing users to post messages. Furthermore, the SNS server 50 has a function for creating a thumbnail for a shared URL on the basis of the specification called OGP (Open Graph Protocol). This is a function provided in services having a function for sharing URLs, including SNSs such as Twitter (registered trademark) and Facebook (registered trademark), as well as a business chat service such as slack (registered trademark). In this embodiment, such a function will be referred to as a crawler. When an identifier such as a URL or a URI has been shared (posted) on an SNS, a crawler automatically accesses the URL (an OGP access), collects a title, a description, a thumbnail image, etc. defined in the HTML text thereof in accordance with the OGP specifications, and saves these items of information in a cache of the SNS server 50. This makes it possible to display an SNS message together with a thumbnail on an SNS at high speed, without being affected by the response speed of the source site. As an example technology relating to crawlers, Patent Literature 2 discloses a crawler for preferentially collecting webpages including OGP tags.

Examples of the SNS provided by the SNS server 50 include Twitter (registered trademark), Facebook (registered trademark), Instagram (registered trademark), LinkedIn (registered trademark), and LINE (registered trademark).

The system 1 in this embodiment utilizes the operation of the known SNS server 50, like the one described above; however, the system 1 may be configured not to include the SNS server 50.

The service providing server 10 is an example of a server system configured to include one or more server devices. The service providing server 10 may be realized either by a cloud system or by a single device. The service providing server 10 includes a known game server that accepts accesses from the individual client terminals 30 and that provides a game service via the network 2, or has the functionality of a known game server. For convenience of description, the service providing server 10 is described as being realized by a single device in this embodiment.

Figure 2:
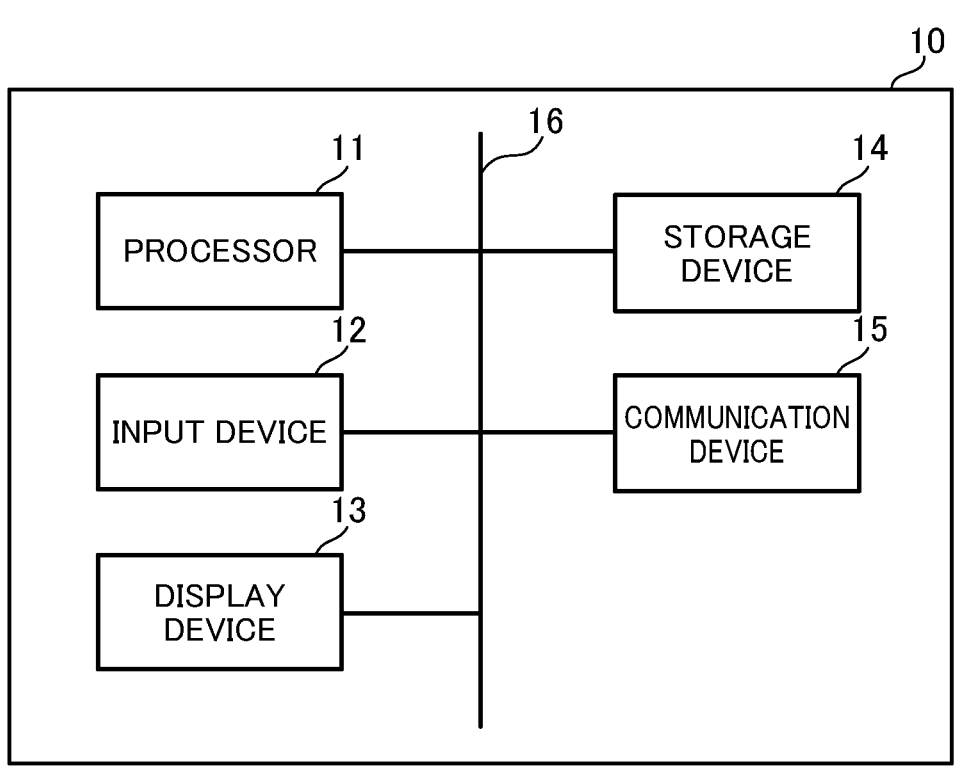
FIG. 2 is a block diagram showing the hardware configuration of a service providing server in one embodiment of the present invention.

FIG. 2 is a block diagram showing the hardware configuration of the service providing server 10 in one embodiment of the present invention. The service providing server 10 includes a processor 11, an input device 12, a display device 13, a storage device 14, and a communication device 15. These constituent devices are connected via a bus 16. Note that interfaces are interposed as needed between the bus 16 and the individual constituent devices. The service providing server 10 may include a configuration similar to that of an ordinary server, PC, or the like.

The processor 11 controls the overall operation of the service providing server 10. For example, the processor 11 is a CPU. The processor 11 executes various kinds of processing by loading programs and data stored in the storage device 14 and executing the programs. The processor 11 may be constituted of a plurality of processors.

The input device 12 is a user interface that accepts inputs to the service providing server 10 from users. For example, the input device 12 is a touch panel, a touchpad, a keyboard, a mouse, or buttons. The display device 13 is a display that displays application screens, etc. to the user of the service providing server 10 under the control of the processor 11.

The storage device 14 includes a main storage device and an auxiliary storage device. The main storage device is a semiconductor memory such as a RAM. The RAM is a volatile storage medium that allows high-speed reading and writing of information, and is used as a storage area and a work area when the processor 11 processes information. The main storage device may include a ROM, which is a read-only, non-volatile storage medium. The auxiliary storage device stores various programs, as well as data that is used by the processor 11 when executing the programs. The auxiliary storage device may be a non-volatile storage or non-volatile memory of any type that is capable of storing information, which may be of the removable type.

The communication device 15 transmits data to and receives data from other computers, such as user terminals and servers, via a network. For example, the communication device 15 is a wireless LAN module. The communication device 15 may be other types of wireless communication device, module, or the like, such as a Bluetooth (registered trademark) module. Alternatively, the communication device 15 may be a wired communication device, module, or the like, such as an Ethernet (registered trademark) module or a USB interface.

Figure 3:
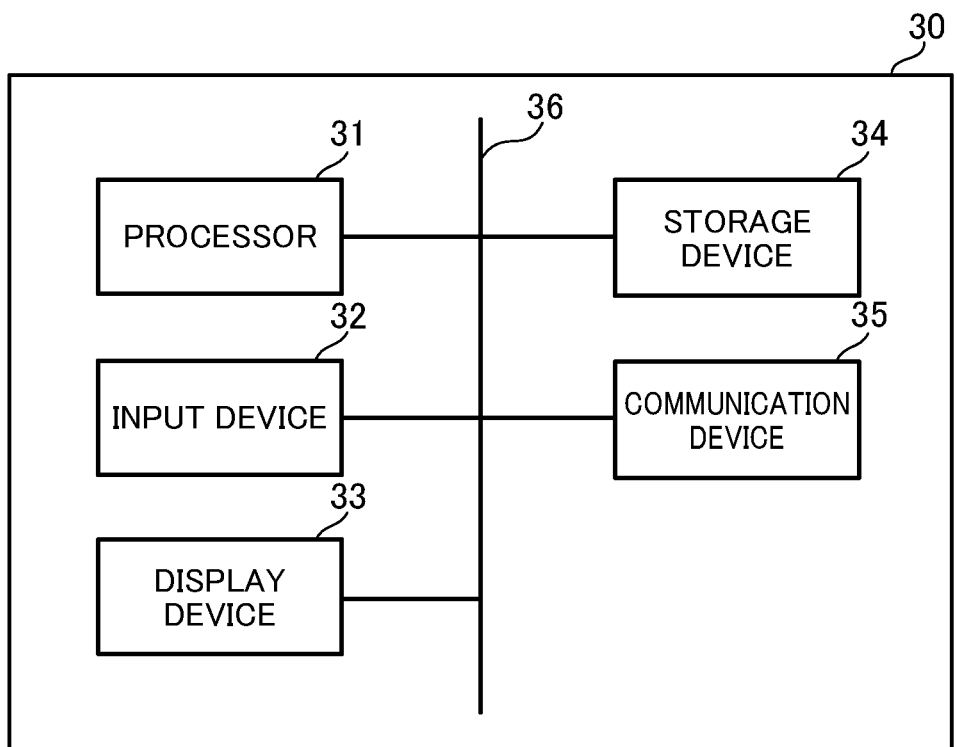
FIG. 3 is a block diagram showing the hardware configuration of a client terminal in one embodiment of the present invention.

FIG. 3 is a block diagram showing the hardware configuration of each of the client terminals 30 in one embodiment of the present invention. Each of the client terminals 30 includes a processor 31, an input device 32, a display device 33, a storage device 34, and a communication device 35. These constituent devices are connected via a bus 36. Note that interfaces are interposed as needed between the bus 36 and the individual constituent devices. The individual elements, namely, the processor 31, the input device 32, the display device 33, the storage device 34, and the communication device 35, respectively correspond to the processor 11, the input device 12, the display device 13, the storage device 14, and the communication device 15 described above, having similar configurations. Thus, descriptions of these elements will be omitted. In this embodiment, each of the client terminals 30 is a smartphone. Accordingly, the input device 32 is a touch panel having a structure integrated with the display device 33 (a display). However, each of the client terminals 30 may be other types of portable terminal having the configuration described above, such as a computer equipped with a contact-based input device, like a tablet terminal or a touchpad.

Figures 4, 5:
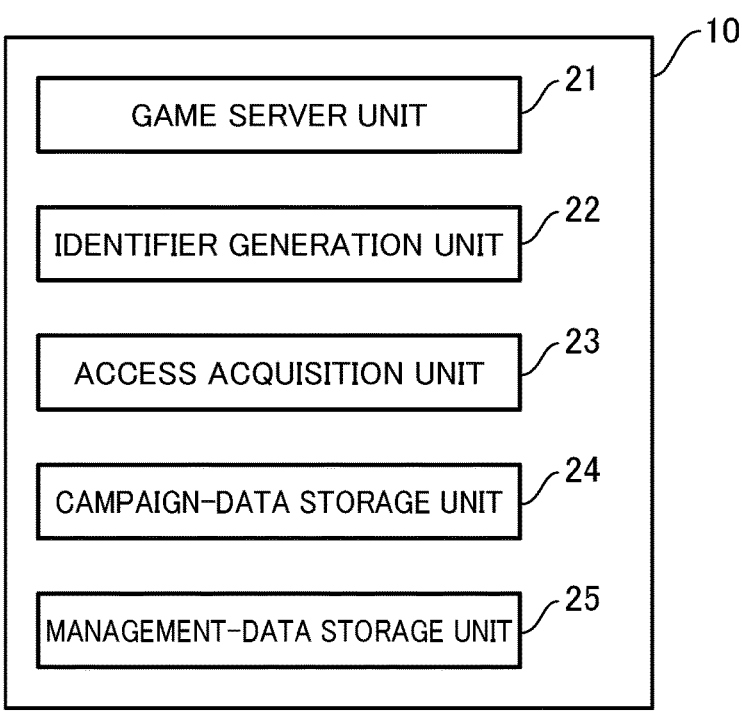
FIG. 4 is a functional block diagram of the service providing server 10 in one embodiment of the present invention.
FIG. 5 is a figure showing an example management database.

FIG. 4 is a functional block diagram of the service providing server 10 in one embodiment of the present invention. The service providing server 10 includes a game server unit 21, an identifier generation unit 22, an access acquisition unit 23, a campaign-data storage unit 24, and a management-data storage unit 25. In this embodiment, these functions are realized by the processor 11 executing programs or by the storage device 14. For example, the programs that are executed are programs stored in the storage device 14 or received via the communication device 15.

Since various kinds of functions are realized by loading programs, as described above, a portion or the entirety of one part (function) may be provided in another part. Alternatively, these functions may be realized by means of hardware by configuring electronic circuits or the like for realizing the individual functions in part or in entirety. Note that, for example, in the case where the service providing server 10 has a database function, the storage device 14 stores data (e.g., tables) and programs for a database, and the database is realized by the programs being executed.

The game server unit 21 has the functionality of a known game server for accepting accesses from the individual client terminals 30 and providing a game service via the network 2. The game server 21 receives a user ID and a password or the like from a client terminal 30 to authenticate the user thereof and communicates with the authenticated client terminal 30 to transmit data needed for providing the game service. The game server 21 is in a state of communicating with the client terminal 30 while a game app is running at the client terminal 30. In one example, the game server unit 21 periodically or intermittently communicates with the client terminal 30 while the game app is running at the client terminal 30, executes the game in accordance with game operations input at the client terminal 30, and transmits the results of execution to the client terminal 30. In one example, the game server unit 21 has a database function, and stores data and logs concerning the game progress status, etc. of each user in association with the user ID of that user. The user ID is an example of user identification information that makes it possible to uniquely identify the user.

The identifier generation unit 22, upon receiving request information relating to a prescribed campaign from one user via the client terminal 30 thereof, generates a second identifier including a first identifier, the first identifier being a user ID that makes it possible to identify the one user or being based on the user ID. The request information includes the user ID of the one user. The user ID is an ID for the purpose of identification of the user by the game server unit 21 and is an ID that is used by the user when playing the game. The user ID is a non-temporary ID. The first ID is the character string of the user ID or a character string that is based on the user ID. In this embodiment, the first identifier is a random text string associated with the user ID. The second identifier is an identifier including the first identifier and is a temporary (one-time) identifier. In this embodiment, the second identifier is a URL. The first identifier may be the user ID itself (e.g., the character string of the user ID), may be a temporary or non-temporary identifier associated with the user ID, or may be a temporary or non-temporary identifier calculated on the basis of the user ID.

The access acquisition unit 23 acquires a user ID on the basis of an access from the SNS server 50 to the second identifier included in a message transmitted to the SNS server 50. In one example, the access acquisition unit 23 is implemented as a web server that hosts the second identifier (URL) generated by the identifier generation unit 22, or as one of the functions of the web server. In one example, when the second identifier (URL) has been shared for the first time, the SNS server 50 accesses the second identifier (URL) in order to cache OGP information. When the second identifier has been accessed by a certain system, by using the access source information thereof, the access acquisition unit 23 detects whether or not an access for caching OGP information (an OGP access) has occurred. In one example, by using the user agent character string that is used by the crawler of the SNS server 50 or the IP address of the access source as a clue, the access acquisition unit 23 can recognize that the second identifier (URL) has been posted to the SNS server 50. As the access source information, for example, the Facebook crawler uses the user agent character string "facebookexternalhit/1.1" when crawling the HTML text of websites shared on Facebook. In one example, the web server or web server function implementing the access acquisition unit 23 returns a suitable title, explanation, and thumbnail image to the crawler of the SNS server 50. As the title, explanation, and thumbnail image, for example, a title, explanation, and thumbnail image indicating that the application for the campaign has been successful are set.

The campaign-data storage unit 24 stores data relating to campaigns. In one example, the data relating to campaigns include campaign IDs that make it possible to uniquely identify the campaigns, the periods during which the campaigns are run, conditions for granting rewards, data items for which rewards are granted, images, illustrations, text items to be displayed in the game, data relating to layouts, etc.

The management-data storage unit 25 stores user IDs and second identifiers in association with each other. In this embodiment, the management-data storage unit 25 is realized by a management database (a management DB). The management DB associates first identifiers with user IDs in that the management DB associates second identifiers including first identifiers with user IDs. The management DB may store first identifiers and user IDs in direct association with each other. Furthermore, the management DB may further store additional information in association with user IDs or the like. FIG. 5 is a figure showing an example management DB. "One-Time URL" shows second identifiers, which are temporary identifiers, "User ID" shows user IDs, and "Optional Data" shows additional information, which is information that is provided additionally. For example, each item of additional information is described in the JSON data format.

The identifier generation unit 22 stores received user IDs and generated second identifiers in association with each other in the management DB unit 25. Upon the occurrence of an OGP access, the access acquisition unit 23 recognizes the second identifier mentioned in the message posted to the SNS server 50, acquires the user ID associated with the second identifier by using the management DB 25, and notifies the game server unit 21 of the user ID (passes the user ID). The access acquisition unit 23 may notify the game server unit 21 of the additional information associated with the acquired user ID in the management DB 25.

The game server unit 21 executes granting of a prescribed reward in the campaign having the campaign ID in association with the user ID acquired by the access acquisition unit 23. Thus, the user playing the game with the user ID is granted the prescribed reward; for example, the user acquires a prescribed item in the game.

Each of the client terminals 30 has installed therein iOS (registered trademark) as an OS and is configured such that a plurality of apps that can run on the OS can be installed. Each of the client terminals 30 has a game app 41 and an SNS app 42 installed therein. Note that although iOS (registered trademark) is assumed as the OS installed in each of the client terminals 30 for convenience of description, without limitation to iOS, a different kind of OS, such as Windows (registered trademark) or Android (registered trademark), may be installed.

The game app 41, upon being started on the client terminal 30, communicates with the game server unit 21. Then, the game server unit 21 identifies the user by using the user ID and provides the game service to the client terminal 30 (or to the user thereof). The SNS app 42, upon being started on the client terminal 30, communicates with the SNS server 50. Then, the SNS server 50 provides the social networking service to the client terminal 30 (or to the user thereof).

Figure 6:
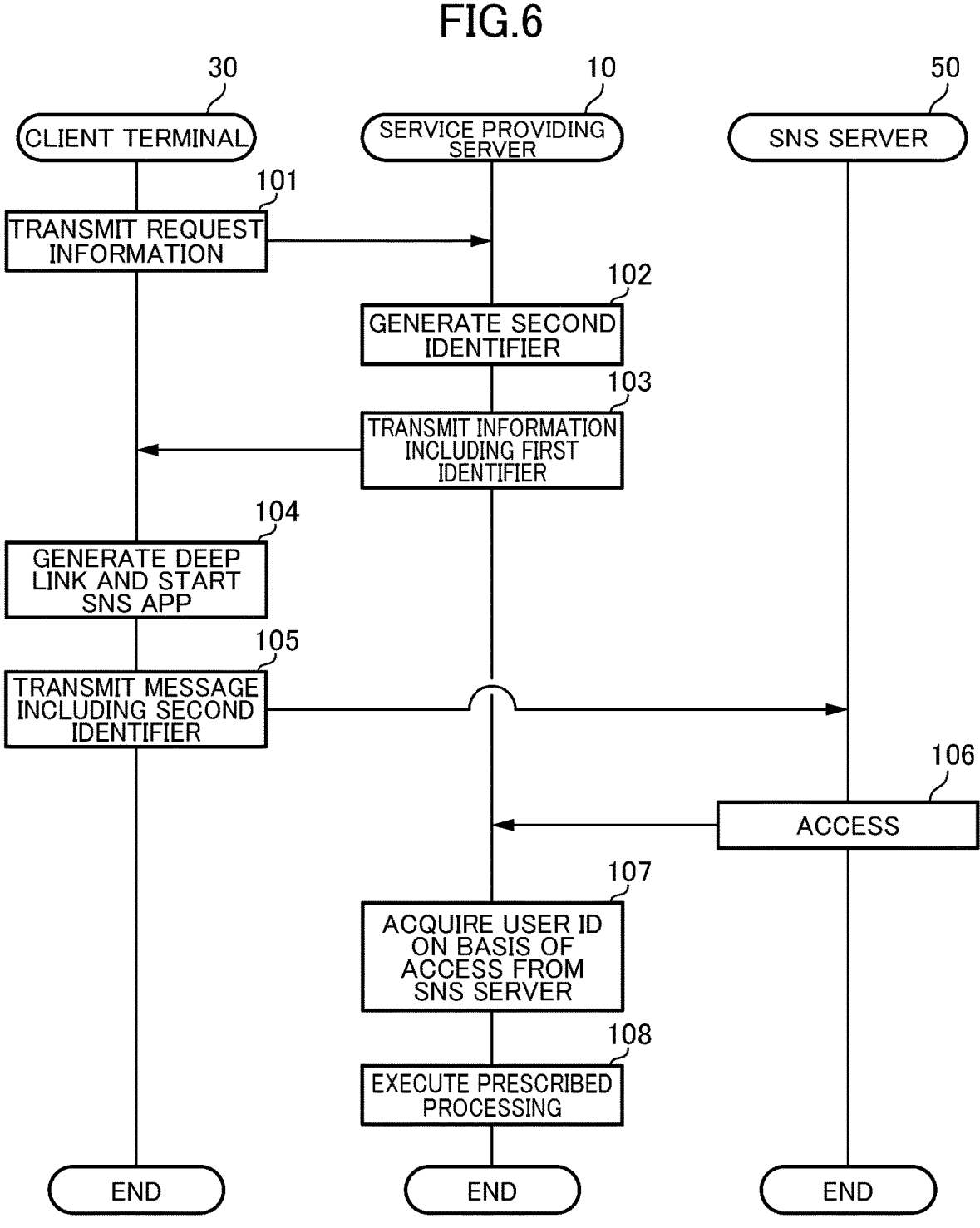
FIG. 6 is a figure showing a flowchart of processing by the system 1 in one embodiment of the present invention.

FIG. 6 is a figure showing a flowchart of processing by the system 1 in one embodiment of the present invention. This flowchart assumes the case where the game administrator has set campaign A in which the game provided by the game app 41 and the SNS provided by the SNS app 42 are linked with each other. In this case, the campaign-data storage unit 24 stores data relating to campaign A.

Furthermore, at the start of this flowchart, the client terminal 30 is in a state in which the game app 41 is running, while having logged in by using the user ID. At this time, the client terminal 30 displays a screen for accepting posting of a message to the SNS, relating to campaign A, on the display device 33. For example, the game server unit 21 refers to the campaign-data storage unit 24, and generates a campaign area in the game provided by the client terminal 30, the campaign area being an area for displaying the content of campaign A and accepting participation into campaign A. The campaign area may be a campaign page that can be accessed from a normal game screen, or may be an area that is displayed in a prescribed region of a normal game screen. The campaign area includes a GUI such as a button, including the text "Post to SNS", for accepting participation into campaign A. For example, when the user touches the GUI for accepting participation into campaign A, displayed on the touch panel of the client terminal 30, the client terminal 30 transmits request information for participation into campaign A to the game server unit 21.

In step 101, the client terminal 30 transmits request information including the user ID to the service providing server 10 in response to a user operation via an interface for accepting message transmission to the SNS server 50 for the purpose of participation into campaign A. For example, upon receiving an input to the GUI for accepting participation into campaign A in response to a user operation, the client terminal 30 transmits request information including the user ID to the service providing server 10. The request information includes information that makes it possible for the service providing server 10 to recognize that the request information is information for participating in the campaign A.

In step 102, the identifier generation unit 22, upon receiving the request information from the client terminal 30, generates a second identifier (URL) including the first identifier associated with the user ID included in the request information received. The identifier generation unit 22 stores the received user ID and the generated second identifier in association with each other in the management DB 25.

In step 103, the service providing server 10 transmits information including the first identifier associated with the user ID to the client terminal 30.

In step 104, the client terminal 30, upon receiving the first identifier from the service providing server 10, generates a second identifier including the first identifier, and generates a deep link substantially including the second identifier generated. The client terminal 30 starts the SNS app 42 by using the generated deep link and displays a screen for posting a message including the second identifier. For example, the client terminal 30 starts the SNS app 42 while passing an SNS message including the second identifier by using a custom URL scheme.

In step 105, the client terminal 30 transmits the message including the second identifier to the SNS server 50 in response to a user operation.

Figure 7:
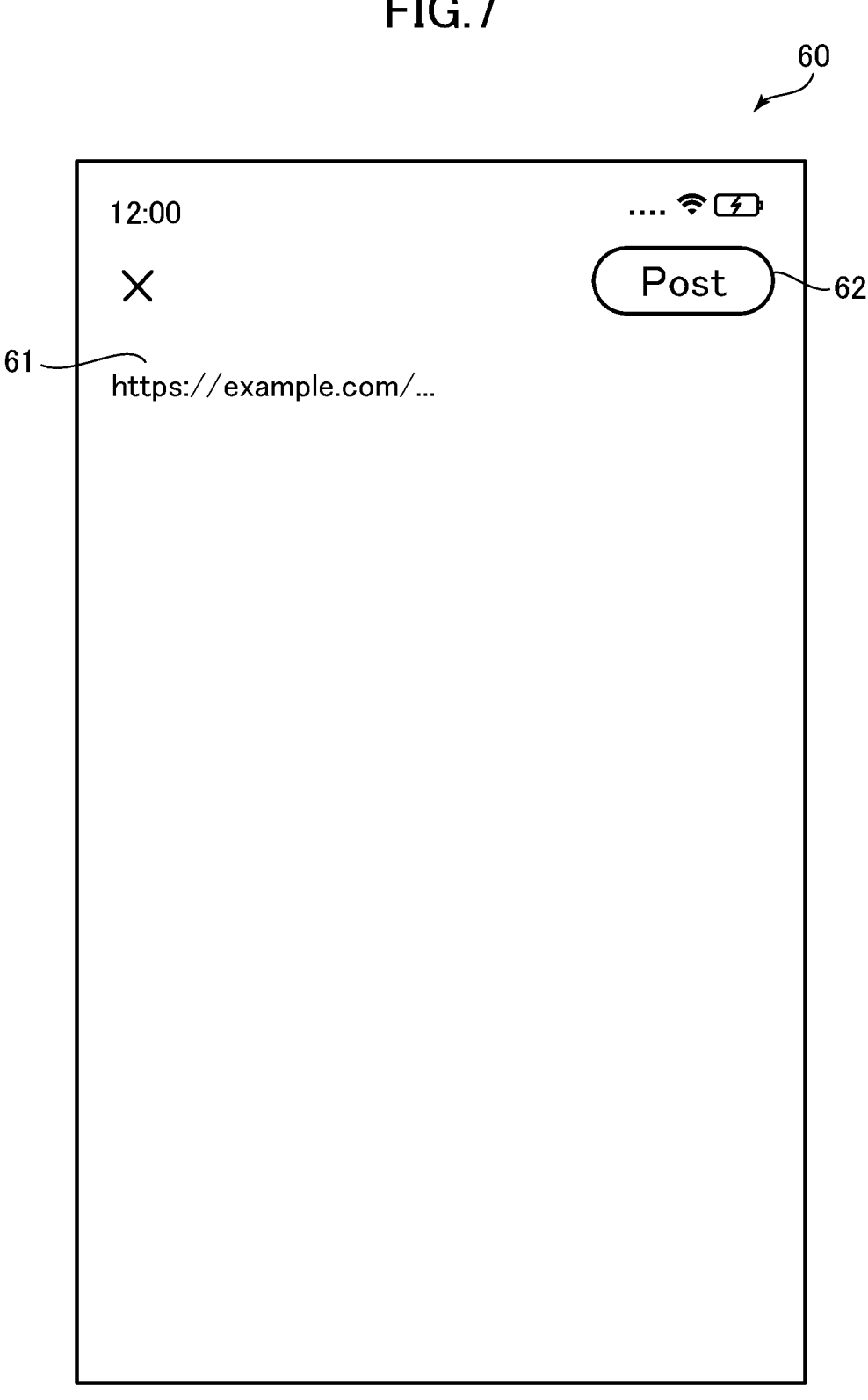
FIG. 7 shows an example screen for posting a message, which is displayed on a touch panel of the client terminal.

FIG. 7 shows an example of a screen 60 for posting a message, which is displayed on the touch panel of the client terminal 30. The screen 60 of the SNS app 42 automatically started in step 104 includes a message 61 for posting, in which the second identifier is automatically entered, and a posting button 62. For example, in step 105, when the user touches the posting button 62 displayed on the touch panel, the client terminal 30 transmits the second identifier to the SNS server 50 as the message 61 for posting.

In step 106, the SNS server 50 accesses the second identifier (URL) in order to cache OGP information.

In step 107, the access acquisition unit 23 recognizes the second identifier posted to the SNS server 50 from the OGP access from the SNS server 50 in step 106, and acquires a user ID on the basis of the second identifier. The access acquisition unit 23 notifies the game server unit 21 of the user ID acquired. In step 108, the game server unit 21 executes granting of a prescribed reward relating to campaign A in association with the acquired user ID in the game app 41.

In one example, the second identifier that is generated in step 102 is a URL dictated in a format like "https://<hostname>/<one-time-user-id>". The "<hostname>" part indicates the host name of the service providing server 10, and is dictated, for example, like "cygames.com". The "<hostname>" part may include a port number. The "<one-time-user-id>" part indicates the path name, and is dictated, for example, like "YUI31SAY329SAGHJ". The "<one-time-user-id>" part is a random character string associated with the user ID, and corresponds to the first identifier. For example, the identifier generation unit 22 dictates "YUI31SAY329SAGHJ", randomly associated with the user ID "0000001", as "<one-time-user-id>". Since the client terminal 30 is communicating with the game server unit 21 while the game app 41 is running, the client terminal 30 has already acquired information concerning the host name "https://cygames.com" in advance. Thus, in step 102, upon receiving request information including the user ID "0000001", the identifier generation unit 22 can associate the user ID with the first identifier "YUI31SAY329SAGHJ", which is a random character string, and can generate a second identifier (URL) https://cygames.com/YUI31SAY329SAGHJ by using the acquired host name "https://cygames.com". Note that the "<one-time-user-id>" part, which indicates the path name, may be changed in accordance with the configuration of the service providing server 10. In one example, the "<hostname>" part may include information relating to a campaign, such as a campaign ID, or may include information for uniquely identifying the game.

In this example, in step 104, the client terminal 30, upon receiving the first identifier "YUI31SAY329SAGHJ", generates a second identifier "https://cygames.comYUI31SAY329SAGHJ". In the case where the SNS app that is started is a Twitter (registered trademark) app, the client terminal 30 generates a character string (a deep link) "twitter://post?message= https%3A%2F%2Fcygames. com%2FYUI31SAY329SAGHJ" as a custom URL scheme. The "twitter://post" part is a URL character string for starting the Twitter app from an arbitrary app, and the "?message=" part indicates an instruction to the Twitter app that "the character string following '=' is to be included in the draft of the message for posting". The "https%3A%2F%2Fcygames.
com%2FYUI31SAY329SAGHJ" part is a character string generated by encoding the second identifier "https://cygames.com/YUI31SAY329SAGHJ" in the format called URL encoding. As described above, the deep link generated by the client terminal 30 includes information corresponding to the second identifier. The client terminal 30, upon starting the Twitter app by using the deep link generated, displays an SNS posting screen having the character string (the second identifier) "https://cygames.com/YUI31SAY329SAGHJ" entered therein.

In this example, in step 105, in response to a user operation, the client terminal 30 accepts the message input of the second identifier (URL) "https://cygames.com/YUI31SAY329SAGHJ", and transmits the message to the SNS server 50.

In this example, in step 106, the SNS server 50 accesses the URL https://cygames.com/YUI31SAY329SAGHJ in order to cache OGP information. The access to the URL by the SNS server 50 is an access for acquiring OGP metadata by the crawler of the SNS server 50, and differs from a normal access to the URL by a web browser. For example, an access by the crawler of the SNS server 50 differs from a normal http request: specifically, the user agent header has an SNS-specific character string set therein, namely, "Twitterbot/1.0" in the case of Twitter, "facebookexternalhit/1.1" in the case of Facebook, "facebookexternalhit/1.1;linepoker/1.0" in the case of LINE, and "Slackbot-LinkExpanding 1.0" in the case of Slack. This makes it possible for the access acquisition unit 23 to discriminate the type of SNS of the SNS server 50 and to recognize that the access is an access from the crawler of the SNS.

Next, main operations and advantages of the service providing server 10 according to the embodiment of the present invention will be described. In this embodiment, for example, upon accepting an input for accepting participation into a campaign in response to a user operation in the case where the game app 41 is running, while having logged in by using a user ID, a client terminal 30 transmits request information including the user ID to the service providing server 10. Upon receiving the request information, the service providing server 10 generates a second identifier (URL) including a first identifier that is based on the user ID, and transmits information including the first identifier to the client terminal 30. Upon receiving the information including the first identifier, the client terminal 30 displays a screen for posting a message including the second identifier including the first identifier, and transmits the message including the second identifier to the SNS server 50 in response to a user operation. When the second identifier (URL) has been shared for the first time, the SNS server 50 accesses the second identifier (URL) in order to cache OGP information. The service providing server 10 acquires a user ID on the basis of the OGP access, and executes prescribed processing in association with the user ID.

As described above, in this embodiment, with the configuration for utilizing the feature wherein a crawler of an SNS system automatically accesses a URL posted by a user in response to the URL, it becomes possible to associate a posting to an SNS with a user ID of the game app 41 by using, as a trigger, an event in which "a crawler of an SNS system has accessed a URL uniquely assigned to a specific user". Furthermore, since the URL posted by the user may include data relating to a campaign, such as a campaign ID, it becomes possible for the service providing server 10 to associate a posting to an SNS with a user ID of the game app 41 as well as the data relating to the campaign. Furthermore, the system 1 in this embodiment does not require account linking (e.g., account association between an account of the game app 41 and an account of the SNS app 42), which has been required with existing technologies. This makes it possible for users to participate by using a simpler method in the case where a prescribed SNS-linked campaign is run in the game app 41 subject to promotion. Furthermore, since there is no need for account linking, which has been required with existing technologies, no transfer of personal information is involved. This makes it possible to reduce the risk of leakage or the like concerning personal information of users.

In this embodiment, as described earlier, the service providing server 10 executes prescribed processing, such as granting a prescribed reward in the game, in association with a user ID acquired on the basis of an OGP access. This makes it possible to grant rewards individually in accordance with the posting status of each user. Accordingly, it becomes possible to enhance users' motivations for posting relating to campaigns, further activating promotion of the game app 41 on SNSs.

Furthermore, in this embodiment, regarding the operations that are performed by the user of a client terminal 30 to participate in a prescribed campaign, the user can receive a reward depending on the content of a posting with two touches, namely, a touch for transmitting request information and a touch for posting an SNS message. This configuration enables a user to participate by using a simpler method in this embodiment.

The system 1 in this embodiment utilizes an OGP access, which is a function outside the privacy function of the SNS server 50. Thus, the system 1 is able to work effectively even with what are called restricted accounts or with a closed SNS such as slack as long as the SNS server 50 attempts to generate thumbnails for URLs by using a crawler.

Furthermore, in this embodiment, second identifiers that are generated by the service providing server 10 may be temporary identifiers associated with user IDs. Since the identifier generation unit 22 has to generate a number of second identifiers (URLs) corresponding to the product of the number of events and the number of users, by using temporary identifiers as second identifiers, it becomes possible to implement this function more easily.

Furthermore, in this embodiment, first identifiers included in second identifiers that are generated by the service providing server 10 may be temporary identifiers associated with user IDs. This configuration makes it possible to further reduce the risk of leakage or the like concerning personal information of users in this embodiment.

The operations and advantages described above also apply similarly to other embodiments and other modifications unless otherwise specifically mentioned.

Another embodiment of the present invention may be a program for realizing the functions or the information processing shown in the flowchart in the above-described embodiment of the present invention, or a computer-readable storage medium storing the program. Furthermore, another embodiment of the present invention may be a method for realizing the functions or the information processing shown in the flowchart in the above-described embodiment of the present invention. Furthermore, another embodiment of the present invention may be a server that is capable of providing a computer with a program for realizing the functions or the information processing shown in the flowchart in the above-described embodiment of the present invention. Furthermore, another embodiment of the present invention may be a virtual machine or a cloud system for realizing the functions or the information processing shown in the flowchart in the above-described embodiment of the present invention.

In one or more embodiments of the present invention, the management DB 25 may be configured to store execution information in association with each user ID, the execution information indicating whether or not the prescribed processing in step 108 has already been executed. The following describes an embodiment in which the management DB 25 is configured to store execution information in association with each user ID. In this embodiment, in step 108, the service providing server 10, upon executing the prescribed processing, updates the corresponding execution information stored in the management DB 25 to "executed". Furthermore, in this embodiment, prior to step 102, upon receiving request information relating to a prescribed campaign from one user, the service providing server 10 determines, on the basis of the user ID and the execution information stored in the management DB 25, whether or not the request information from the one user, relating to the campaign, has been executed. With this configuration, the system 1 in this embodiment makes it possible to prevent a single user from participating in the same campaign many times and receiving rewards.

In one or more embodiments of the present invention, first identifiers may be hash values calculated from user IDs. First identifiers may be hash values permanently corresponding to user IDs one by one, or may be hash values corresponding to user IDs one by one on a one-time basis.

In one or more embodiments of the present invention, second identifiers may be identifiers that are not URLs, such as URIs or identifiers having a similar function.

In one or more embodiments of the present invention, the identifier generation unit 22 may generate a second identifier in advance each time the game screen is updated or at a prescribed timing, such as when the game is started, instead of generating a second identifier at the timing at which request information is received. In an embodiment in which the identifier generation unit 22 configured as described above generates a second identifier in advance, in step 102, upon receiving request information from a client terminal 30, the identifier generation unit 22 recognizes a user ID included in the request information received, and determines a second identifier including the user ID, which is generated in advance. In this embodiment, the identifier generation unit 22 stores the received user ID and the determined second identifiers in association with each other in the management DB 25.

In one or more embodiments of the present invention, the information that the service providing server 10 transmits to the client terminal 30 in step 103 suffices to include information including a first identifier, and the service providing server 10 may transmit a second identifier. In such an embodiment in which the service providing server 10 transmits a second identifier, in step 104, upon receiving the second identifier from the service providing server 10, the client terminal 30 generates a deep link substantially including the second identifier received. For example, the client terminal 30 starts the SNS app 42 by using the deep link generated, and displays a screen for posting a message including the second identifier.

In one or more embodiments of the present invention, the transmission by the service providing server 10 in step 103 may be carried out in data communication necessary for providing the game service between the game server unit 21 and the client terminal 30.

In one or more embodiments of the present invention, the client terminal 30 may be configured to start a web browser by using the deep link generated, to access a web page provided by the SNS server 50, and to display a screen for posting a message including the second identifier in step 104, instead of starting the SNS app 42 by using the deep link generated. In one or more embodiments of the present invention, the client terminal 30 may be configured to generate a new window or tab in a running web browser by using the deep link generated, to access a web page provided by the SNS server 50, and to display a screen for posting a message including the second identifier in step 104, instead of starting the SNS app 42 by using the deep link generated.

In one or more embodiments of the present invention, the client terminal 30 may be configured to transmit the message including the second identifier to the SNS server 50 without having to accept an operation by the user in step 105. In such an embodiment in which the client terminal 30, upon receiving the first identifier from the service providing server 10, automatically transmits the message including the second identifier to the SNS server 50, the client terminal 30 may be configured not to display a screen for posting a message including the second identifier in step 104.

In one or more embodiments of the present invention, the GUI including the text "Post to SNS", included in the campaign area, may be disposed for each kind of SNS. For example, the campaign area may include a "Post to Twitter" button, a "Post to Facebook" button", etc.

In one or more embodiments of the present invention, in the case where there is no need to set campaign IDs, such as the case where there is only one campaign that is run during the same period, second identifiers need not include campaign IDs, and the campaign-data storage unit 24 need not store campaign IDs. In such an embodiment in which second identifiers do not include campaign IDs, request information suffices to include information that makes it possible for the service providing server 10 to recognize that the request information is information for participating in a campaign, and need not include other information relating to the campaign.

In one or more embodiments of the present invention, request information suffices to include information that makes it possible for the service providing server 10 to recognize that the request information is information for participating in a desired campaign (e.g., campaign A), and need not include a campaign ID.

In one or more embodiments of the present invention, the request information that is transmitted by the client terminal 30 in step 101 may include a campaign ID. The following describes an embodiment in the case where the request information includes a campaign ID. In this embodiment, the campaign-data storage unit 24 stores the campaign ID of campaign A.

In this embodiment, in step 101, the client terminal 30 transmits request information including the user ID and the campaign ID to the service providing server 10 in response to a user operation performed via the interface for accepting message transmission to the SNS server 50 for participation into campaign A. For example, the client terminal 30, upon accepting an input to the GUI for accepting participation into campaign A in response to a user operation, transmits request information including the user ID and the campaign ID to the service providing server 10. In step 102, the identifier generation unit 22, upon receiving the request information from the client terminal 30, generates a second identifier (URL) including the first identifier associated with the user ID included in the request information received and also including the campaign ID included in the request information. In step 107, the access acquisition unit 23 notifies the game server unit 21 of the user ID acquired and the campaign ID obtained from the second identifier. In step 108, the game server unit 21 executes granting a prescribed reward relating to campaign A having the campaign ID in the game app 41, in association with the user ID acquired.

In one example of this embodiment, the second identifier that is generated in step 102 is a URL written in a format like "https://<hostname>/<game-id>/<campaign-id>/<one-time-user-id>". The "<game-id>/<campaign-id>/<one-time-user-id>" part indicates the path name, and is written, for example, like "great_game/c01234/YUI31SAY329SAGHJ". The "<game-id>" part is a character string for uniquely identifying the game of the game app 41. The "<campaign-ID>" part is a character string indicating the campaign ID of campaign A. The "<one-time-user-id>" part indicates a random character string associated with the user ID, corresponding to the first identifier. For example, the identifier generation unit 22 writes "YUI31SAY329SAGHJ" randomly associated with the user ID "0000001" as "<one-time-user-id>". Since the client terminal 30 is communicating with the game server unit 21 while the game app 41 is running, the client terminal 30 has acquired in advance information concerning the host name "https://cygames.com", the game ID "great_game", and the campaign ID "c01234". Thus, in step 102, the identifier generation unit 22, upon receiving request information including the user ID "0000001" and the campaign ID "c01234", can associate the user ID with the first identifier "YUI31SAY329SAGHJ", which is a random character string, and can generate a second identifier (URL) https://cygames.com/great_game/c01234/YUI31SAY329SAGHJ by using the host name "https://cygames.com", the game ID "great_game", and the campaign ID "c01234" acquired.

Note that, in this example, the campaign area provided by the game server unit 21 may include GUIs for accepting participation into campaigns other than campaign A, and the client terminal 30 can also acquire information relating to the other campaigns in advance. In this case, in step 101, the client terminal 30, upon accepting an input to the GUI for accepting participation into campaign A in response to a user operation, transmits request information to the service providing server 10 and acquires the campaign ID "c01234".

In this example, in step 104, the client terminal 30, upon receiving the first identifier "YUI31SAY329SAGHJ", generates a second identifier "https://cygames.com/great_game/c01234/YUI31SAY329SAGHJ". In the case where the SNS app that is started is a Twitter (registered trademark) app, the client terminal 30 generates a character string (a deep link) "twitter://post?message=https%3A%2F%2Fcygames.com%2Fgreat_game%2Fc01234%2FYUI31SAY329SAGHJ" as a custom URL scheme. The client terminal 30 starts the Twitter app by using the deep link generated, and displays an SNS posting screen having the character string (the second identifier) "https://cygames.com/great_game/c01234/YUI31SAY329SAGHJ" entered therein.

In this example, in step 105, the client terminal 30 accepts message posting of the second identifier (URL) "https://cygames.com/great_game/c01234/YUI31SAY329SAGHJ" in response to a user operation. In this example, in step 106, the SNS server 50 accesses the URL "https://cygames.com/great_game/c01234/YUI31SAY329SAGHJ" in order to cache OGP information.

In one or more embodiments of the present invention, the format of writing the second identifier that is generated in step 102 may be changed in accordance with the design of the web server or web server function provided in the service providing server 10. For example, the second identifier may be written in a format like "https://<hostname>/<campaign-id>/<one-time-user-id>", including only "<campaign-id>" and "<one-time-user-id>" in the path name part. Alternatively, the second identifier may be written in a format like "https://<hostname>/<game-id>/<campaign-id>/<one-time-user-id>/<additional-data>", further including additional information <additional-data>. In this case, <additional-data> includes information corresponding to at least a portion of "Optional Data" shown in FIG. 5.

In one or more embodiments of the present invention, each second identifier may include a user ID, a campaign ID, and additional information for a campaign. In such an embodiment in which each second identifier includes a user ID, a campaign ID, and additional information for a campaign, for example, the campaign area includes a user interface for accepting additional information, such as a character ID for voting for a favorite character, together with an interface for accepting participation into a prescribed campaign. In this embodiment, in step 101, the client terminal 30 transmits request information to the service providing server 10 in response to a user operation performed via the user interface mentioned above, the request information including a user ID, a campaign ID, and additional information. In this embodiment, in step 102, the identifier generation unit 22 stores the user ID received, the second identifier generated, and the additional information in association with each other in the management DB 25. In this embodiment, in step 107, the access acquisition unit 23 notifies the game server unit 21 of a user ID acquired on the basis of an OGP access from the SNS server 50, as well as the campaign ID and the additional information obtained from the second identifier. In this embodiment, in step 108, the game server unit 21 executes granting a prescribed reward in accordance with the additional information in the campaign having the campaign ID, in association with the user ID acquired.

In one or more embodiments of the present invention, request information may be configured to include a user ID, a campaign ID, and additional information, while each second identifier may be configured not to include additional information. In such an embodiment in which request information includes a user ID, a campaign ID, and additional information, and in which each second identifier does not include additional information, in step 102, the identifier generation unit 22 stores the user ID received, the second identifier generated, and the additional information in association with each other in the management DB 25. In this embodiment, in step 107, the access acquisition unit 23 notifies the game server unit 21 of a user ID acquired on the basis of an OGP access from the SNS server 50, the campaign ID obtained from the second identifier, and the additional information associated with the acquired user ID in the management DB 25. In this embodiment, in step 108, the game server unit 21 executes granting a prescribed reward in accordance with the additional information in the campaign having the campaign ID, in association with the user ID acquired.

In one or more embodiments of the present invention, the service providing server 10, having accepted an access to a second identifier (URL), can transmit a response, as OGP information, on the basis of game information concerning the user ID stored in association with the second identifier in the management-data storage unit 25. For example, as OGP information, the service providing server 10 can generate and return, as a thumbnail, an image that makes it possible to confirm that the user having the user ID has participated in the campaign.

In one or more embodiments of the present invention, instead of the function for creating a thumbnail for a shared URL on the basis of the OGP specification, the SNS server 50 may have another similar function as a crawler. For example, the crawler of the SNS server 50 may be provided with a function for creating a thumbnail for a shared URL on the basis of the Twitter Card specification. In this case, when an identifier such as a URL or a URI has been shared on (has been posted to) an SNS, the crawler of the SNS server 50 automatically accesses the URL, collects a title, an explanation, a thumbnail image, etc. defined in the HTML text thereof in accordance with the Twitter Card specification, and saves these items of information in a cache of the SNS server 50.

In one or more embodiments of the present invention, the game server unit 21 may be configured to execute prescribed processing other than granting a prescribed reward relating to a prescribed campaign in an app such as the game app 41 in step 108.

In one or more embodiments of the present invention, the game server unit 21 may be configured to execute prescribed processing relating to a prescribed campaign in the game app 41 in accordance with the frequency of posting (e.g., posting every day) to the SNS server 50 in step 108.

In one or more embodiments of the present invention, the game app 41 may be replaced with an app that is not a game. In an embodiment in which the game app 41 is replaced with an app that is not a game, the service providing server 10 includes an app server unit instead of the game server unit 21. In this embodiment, the app server unit has the same functionality as the game server unit 21 except in that the app server unit has the functionality necessary for providing the other app instead of the functionality of a known game server. In this embodiment, for example, a user ID is an ID that is used by a user when using the app, which is an ID that is recognized by the app server unit.

In one or more embodiments of the present invention, the game server unit 21 may be realized by a game server or game server system that is physically different from that of the other functional blocks 22 to 25, or may be realized as a game server system by means of a virtually different cloud.

In one or more embodiments of the present invention, the access acquisition unit 23 may be realized by a web server or web server system that is physically different from that of the other functional blocks 21, 22, 24, and 25, or may be realized as a web server system by means of a virtually different cloud.

In one modified embodiment of the present invention, second identifiers may be non-temporary identifiers. The non-temporary identifiers may be configured, for example, so as to be deleted after the elapse of a prescribed time.

The processing or operation described above may be modified freely as long as no inconsistency arises in the processing or operation, such as an inconsistency that a certain step utilizes data that could not yet be available in that step. Furthermore, the examples described above are examples for explaining the present invention, and the present invention is not limited to those examples. The present invention can be embodied in various forms as long as there is no departure from the gist thereof.

Reference Signs List

1 System
2 Network

10 Service providing server
11 Processor
12 Input device
13 Display device
14 Storage device
15 Communication device
16 Bus
21 Game server unit
22 Identifier generation unit
23 Access acquisition unit
24 Campaign-data storage unit
25 Management-data storage unit
30 client terminal
31 Processor
32 Input device
33 Display device
34 Storage device
35 Communication device
36 Bus
50 SNS server
60 Screen
61 Message for posting
62 Posting button

The invention claimed is:

1. A system, comprising:
a game server;
a social networking service (SNS) server; and
a client terminal connected to the game server and the SNS server over a network,
wherein the client terminal is configured to perform a first method comprising:
displaying, using a game application, a graphical user interface (GUI),
executing, in response to obtaining a first user input to the GUI from a user, a game campaign using the game application through communication with the game server over the network, and
transmitting, in response to obtaining a second user input to the GUI, request information regarding the game campaign to the game server over the network,
wherein the request information comprising a first identifier associated with the user and campaign identification information associated with the game campaign,
wherein the game server is configured to perform a second method comprising:
generating, upon receiving the request information relating to the game campaign from the user via the client terminal, a temporary uniform resource locator (URL) comprising the first identifier and based on the campaign identification information,
wherein the first identifier comprises user identification information for the user, and
transmitting the temporary URL to the client terminal,
wherein the first method further comprises:
displaying, within the game application and upon receiving the temporary URL from the game server, a screen for selecting a post message function within an SNS application based on the game campaign, and
transmitting, in response to obtaining a third user input to the game application for selecting the post message function, a message to the SNS server configured to display the temporary URL with a thumbnail of the temporary URL, and
wherein the SNS server is configured to perform a third method comprising:

obtaining, from the temporary URL and automatically using a crawler and an Open Graph Protocol (OGP) access function in response to receiving the message, OGP information comprising a thumbnail image of the game campaign and a description of the game campaign, storing the OGP information in a cache in the SNS server, and generating the thumbnail of the temporary URL based on the OGP information that is stored in the cache.

2. The system according to claim 1, wherein the temporary URL is based on a temporary identifier associated with the user identification information that makes it possible to identify the one user.

3. The system according to claim 1, wherein the first identifier is non-temporary user identification information that makes is possible to identify the user.

4. The system according to claim 1, wherein the first method of the client terminal further comprises starting the SNS application.

5. The system according to claim 1, wherein the client terminal has installed therein the game application that communicates with the game server and that identifies the user by using the user identification information, and wherein the first identifier is non-temporary user identification information used in the game application.

6. The system according to claim 5, wherein the game application grants a prescribed reward, which is executed in association with the user identification information, and wherein the message to the SNS server indicates the user receiving the prescribed reward.

7. The system according to claim 5, wherein when the game application is running, while having logged in by using the user identification information, the client terminal transmits the request information including the user identification information to the game server in response to a user operation performed via the graphical user interface for accepting message transmission to the SNS server.

8. The system according to claim 1, wherein the game server includes a management database that stores the user identification information and a plurality of temporary URLs in association with each other, and wherein the game server, upon accepting an access from the SNS server to the temporary URL, acquires the user identification information associated with the temporary URL in the management database.

9. The system according to claim 8, wherein the game server stores execution information in association with the user identification information in the management database, the execution information indicating whether or not prescribed processing has already been executed, and when the prescribed processing has been executed, the game server updates the execution information stored in the management database.

10. The system according to claim 9, wherein, upon receiving request information relating to the game campaign from one user, the game server determines, based on the user identification information and the execution information stored in the management database, whether or not the request information from the user, relating to the game campaign, has been executed.

11. A server comprising:

a processor;

a memory connected to the processor, wherein the memory comprises instructions that, when executed by the processor, are configured to perform a method comprising:

generating, upon receiving a request information relating to a game campaign from a user via a client terminal, a temporary uniform resource locator (URL) comprising a first identifier and based on campaign identification information, wherein the first identifier comprises user identification information for a user, and transmitting the temporary URL to the client terminal, wherein the client terminal is configured to:

displays a graphical user interface (GUI) using a game application, executes, in response to obtaining a first user input to the GUI from a user, a game campaign using the game application through communication with the server over a network, and transmits, in response to obtaining a second user input to the GUI, request information regarding the game campaign to the server over the network, wherein the request information comprising a first identifier associated with the user and campaign identification information associated with the game campaign, displaying, within the game application and upon receiving the temporary URL from the server, a screen for selecting a post message function within a social networking service (SNS) application based on the game campaign, and transmits, in response to obtaining a third user input to the game application for selecting the post message function, a message to a SNS server configured to display the temporary URL with a thumbnail of the temporary URL, and wherein the SNS server is configured to:

obtain, from the temporary URL and automatically using a crawler and an Open Graph Protocol (OGP) access function in response to receiving the message, OGP information comprising a thumbnail image of the game campaign and a description of the game campaign, store the OGP information in a cache in the SNS server, and generate the thumbnail of the temporary URL based on the OGP information that is stored in the cache.

12. A method comprising:

displaying, by a client terminal using a game application, a graphical user interface (GUI), wherein the client terminal is connected to a game server and a social networking service (SNS) server over a network, executing, by the client terminal in response to obtaining a first user input to the GUI from a user, a game campaign using the game application through communication with the game server over the network, and transmitting, by the client terminal in response to obtaining a second user input to the GUI, request information regarding the game campaign to the game server over the network, wherein the request information comprising a first identifier associated with the user and campaign identification information associated with the game campaign, wherein the game server is configured to perform a second method comprising:

generating, by the game server upon receiving the request information relating to the game campaign from the user via the client terminal, a temporary uniform resource locator (URL) comprising the first identifier and based on the campaign identification information, wherein the first identifier comprises user identification information for the user, and transmitting, by the game server, the temporary URL to the client terminal, displaying, by the client terminal within the game application and upon receiving the temporary URL from the game server, a screen for selecting a post message function within an SNS application based on the game campaign, and transmitting, by the client terminal in response to obtaining a third user input to the game application for selecting the post message function, a message to the SNS server configured to display the temporary URL with a thumbnail of the temporary URL, and obtaining, by the SNS server from the temporary URL and automatically using a crawler and an Open Graph Protocol (OGP) access function in response to receiving the message, OGP information comprising a thumbnail image of the game campaign and a description of the game campaign, storing, by the SNS server, the OGP information in a cache in the SNS server, and generating, by the SNS server, the thumbnail of the temporary URL based on the OGP information that is stored in the cache.

13. A non-transitory computer readable medium storing a program for causing a computer to execute the steps of a method according to claim 12.

\* \* \* \* \*